US010169071B2

(12) United States Patent
Cochran

(10) Patent No.: US 10,169,071 B2
(45) Date of Patent: *Jan. 1, 2019

(54) HYPERVISOR-HOSTED VIRTUAL MACHINE FORENSICS

(71) Applicant: MICROSOFT TECHNOLOGY LICENSING, LLC, Redmond, WA (US)

(72) Inventor: Jerry Cochran, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,940

(22) Filed: Nov. 16, 2017

(65) Prior Publication Data

US 2018/0088980 A1 Mar. 29, 2018

Related U.S. Application Data

(63) Continuation of application No. 14/806,605, filed on Jul. 22, 2015, now Pat. No. 9,851,998.

(Continued)

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45595* (2013.01); *Y02D 10/22* (2018.01); *Y02D 10/36* (2018.01)

(58) Field of Classification Search
CPC .................. G06F 9/45558; G06F 9/455; G06F 17/30864; G06F 17/30554; G06F 17/30595; H04L 41/5006; H04L 43/04; H04L 43/08

See application file for complete search history.

(56) References Cited

U.S. PATENT DOCUMENTS 7,856,573 B2 * 12/2010 Ingram .................. H04L 63/14
709/226
8,584,254 B2 11/2013 Cui et al.
(Continued)

OTHER PUBLICATIONS

Wyatt Roersma; "Memory Forensics with Hyper-V Virtual Machines"; Digital Forensics Research Conference, Aug. 6, 2014; (Roersma_Aug6_2014.pdf; pp. 1-24).*

(Continued)

*Primary Examiner* — Hiren P Patel
(74) *Attorney, Agent, or Firm* — Christopher J. Volkmann; Kelly, Holt & Christenson, PLLC

(57) ABSTRACT

A computer system acquires forensics data from running virtual machines in a hypervisor-hosted virtualization environment. The computer system provides a forensics partition as an additional root virtual machine partition or child virtual machine partition. The forensics partition includes a forensics service application programming interface configured to target one or more virtual machines and acquire forensics data from a targeted virtual machine running in a particular child virtual machine partition. The forensics service application programming interface is configured to communicate via one or more inter-partition communication mechanisms such as an inter-partition communication bus, a hypercall interface, or forensics switch implemented by the hypervisor-hosted virtualization environment. The forensics service application programming interface can be exposed to a forensics tool as part of a cloud-based forensics service.

20 Claims, 4 Drawing Sheets

Related U.S. Application Data

(60) Provisional application No. 62/030,636, filed on Jul. 30, 2014.

(56) References Cited

U.S. PATENT DOCUMENTS

| | | | |
|---|---|---|---|
| 8,635,057 B2 | 1/2014 | Ganguly et al. | |
| 8,640,238 B2 | 1/2014 | Brueckner et al. | |
| 8,683,592 B1 | 3/2014 | Dotan et al. | |
| 8,825,848 B1 | 9/2014 | Dotan et al. | |
| 8,893,147 B2 * | 11/2014 | Yin | G06F 9/45558 718/105 |
| 8,924,964 B2 * | 12/2014 | Kodi | G06F 9/45558 718/1 |
| 9,092,625 B1 * | 7/2015 | Kashyap | G06F 21/566 |
| 9,094,449 B2 | 7/2015 | Brueckner et al. | |
| 9,203,862 B1 | 12/2015 | Kashyap et al. | |
| 9,389,895 B2 * | 7/2016 | Oshins | G06F 9/45537 |
| 9,600,664 B1 * | 3/2017 | Roth | G06F 21/55 |
| 9,891,862 B2 * | 2/2018 | Yang | G06F 3/0652 |
| 10,079,842 B1 * | 9/2018 | Brandwine | H04L 63/1416 |
| 2006/0236127 A1 | 10/2006 | Kurien et al. | |
| 2007/0050764 A1 * | 3/2007 | Traut | G06F 9/45558 718/1 |
| 2007/0136506 A1 * | 6/2007 | Traut | G06F 9/45504 711/6 |
| 2007/0198976 A1 * | 8/2007 | Leis | G06F 9/45537 718/1 |
| 2008/0016570 A1 * | 1/2008 | Capalik | H04L 63/1408 726/23 |
| 2009/0063684 A1 | 3/2009 | Ingram et al. | |
| 2010/0058432 A1 | 3/2010 | Neystadt et al. | |
| 2010/0235557 A1 * | 9/2010 | Guo | G06F 13/24 710/260 |
| 2011/0154318 A1 | 6/2011 | Oshins et al. | |
| 2011/0191533 A1 | 8/2011 | Coulter | |
| 2011/0252208 A1 | 10/2011 | Ali et al. | |
| 2011/0258701 A1 * | 10/2011 | Cruz | G06F 21/554 726/23 |
| 2011/0295967 A1 * | 12/2011 | Wang | G06F 21/602 709/212 |
| 2011/0307888 A1 | 12/2011 | Raj et al. | |
| 2011/0321165 A1 | 12/2011 | Capalik et al. | |
| 2012/0110572 A1 | 5/2012 | Kodi et al. | |
| 2012/0166456 A1 | 6/2012 | Kim et al. | |
| 2012/0209983 A1 | 8/2012 | Bronner et al. | |
| 2012/0254862 A1 | 10/2012 | Dong | |
| 2012/0272015 A1 | 10/2012 | Fahrig | |
| 2012/0272235 A1 | 10/2012 | Fahrig | |
| 2013/0179971 A1 * | 7/2013 | Harrison | G06F 21/564 726/23 |
| 2013/0181998 A1 | 7/2013 | Malakapalli et al. | |
| 2013/0185716 A1 | 7/2013 | Yin et al. | |
| 2013/0212709 A1 | 8/2013 | Tucker | |
| 2013/0346977 A1 | 12/2013 | Rasmusson | |
| 2014/0059680 A1 | 2/2014 | Kurien et al. | |
| 2014/0157407 A1 | 6/2014 | Krishnan et al. | |
| 2014/0195484 A1 * | 7/2014 | Wang | G06F 17/30215 707/624 |
| 2014/0208166 A1 | 7/2014 | Eck et al. | |
| 2014/0259169 A1 | 9/2014 | Harrison | |
| 2014/0259171 A1 * | 9/2014 | Spikes | H04L 63/1441 726/23 |
| 2014/0317681 A1 | 10/2014 | Shende | |
| 2014/0351810 A1 | 11/2014 | Pratt et al. | |
| 2015/0106334 A1 * | 4/2015 | Lee | G06F 17/30088 707/639 |
| 2015/0106803 A1 | 4/2015 | Srivastava et al. | |
| 2015/0128130 A1 | 5/2015 | Weaver et al. | |
| 2015/0256552 A1 | 9/2015 | Lee et al. | |
| 2016/0020959 A1 | 1/2016 | Rahaman | |

OTHER PUBLICATIONS

Microsoft; "Hyper-V Architecture"; Nov. 4, 2011; (HyperV_Nov4_2011.pdf; pp. 1-2).*

"Final Office Action Issued in U.S. Appl. No. 14/806,605", dated May 16, 2017, 17 Pages.

"Non-Final Office Action Issued in U.S. Appl. No. 14/806,605", dated Dec. 1, 2016, 15 Pages.

"Notice of Allowance Issued in U.S. Appl. No. 14/806,605", dated Aug. 17, 2017, 19 Pages.

Bem, et al., "Computer Forensics Analysis in a Virtual Environment", In International Journal of Digital Evidence, vol. 6, Issue 2, Jan. 2007, 13 Pages.

Brik, et al., "Technical Issues of Forensic Investigations in Cloud Computing Environments", In Sixth International Workshop on Systematic Approaches to Digital Forensic Engineering, May 26, 2011, 10 Pages.

Chandrashekar, et al., "Secure Design and Best Practices for Your Private Cloud", Retrieved From <<https://channel9.msdn.com/Events/TechEd/NorthAmerica/2014/DCIM-B219>>, May 15, 2014, 53 Pages.

Dykstra, et al., "Acquiring Forensic Evidence Exploring from Insfrastructure as a Service Cloud Computing", In Proceedings of Exploring and Evaluating Tools, Trust and Techniques, vol. 9, Aug. 2012, 9 Pages.

Holt, et al., "Cloud Forensics: A Technical Approach to Virtual Machine Acquisition", In Proceedings of European Intelligence and Security Informatics Conference, Aug. 12, 2013, 1 Page.

Hyde, Doug, "A Survey on the Security of Virtual Machines", Retrieved From <<http://www.cs.wustl.edu/~jain/cse571-09/ftp/vmsec/>>, Apr. 21, 2009, 11 Pages.

Mandiant, Corporation, "Mandiant Intelligent Response", Retrieved from <<https://www.fireeye.fr/content/dam/fireeye-www/global/en/products/pdfs/fireeye-endpoint-forensics.pdf>>, Jun. 2012, 2 Pages.

Microsoft, Corporation, "Generation 2 Virtual Machines", Retrieved From <<https://www.microsoft.com/en-us/download/confirmation.aspx?id=40732>>, Jul. 27, 2014, 1 Page.

Microsoft, Corporation, "Hyper-V and Failover Clustering", Retrieved From <<https://www.microsoft.com/en-us/download/confirmation.aspx?id=40732>>Jul. 27, 2014, 1 Page.

Microsoft, Corporation, "Hyper-V and Failover Clustering Mini Poster", Retrieved From <<http://www.microsoft.com/download/details.aspx?id=41665>>, Jul. 27, 2014, 1 Page.

Microsoft, Corporation, "Hyper-V Architecture", Retrieved From <<https://msdn.microsoft.com/en-us/library/cc768520(v=bts.10).aspx>>, Jul. 27, 2014, 4 Pages.

Microsoft, Corporation, "Hyper-V Component Architecture Posters", Retrieved From <<https://technet.microsoft.com/en-us/library/hh849639(v=ws.11).aspx>>, Jul. 27, 2014, 1 Page.

Microsoft, Corporation, "Hyper-V Storage", Retrieved From <<https://www.microsoft.com/en-us/download/confirmation.aspx?id=40732>>, Jul. 27, 2014, 1 Page.

Microsoft, Corporation, "Hyper-V Storage: Hyper-V with Virtual Hard Disk Sharing", Retrieved From <<https://www.microsoft.com/en-us/download/confirmation.aspx?id=40732>>, Jul. 27, 2014, 1 Page.

Microsoft, Corporation, "Hyper-V Switch Architecture", Retrieved From <<https://blogs.msdn.microsoft.com/sdncorner/2014/02/21/hyper-v-virtual-switch-architecture/>>, Jul. 27, 2014, 3 Pages.

Microsoft, Corporation, "Hyper-V Virtual Switch Overview", Retrieved From <<https://technet.microsoft.com/en-us/library/hh831823(v=ws.11).aspx>>, Jul. 27, 2014, 3 Pages.

Microsoft, Corporation, "Hyper-V WMI Provider", Retrieved From <<https://msdn.microsoft.com/en-us/library/cc136992(v=vs.85).aspx>>, Jul. 27, 2014, 2 Pages.

Microsoft, Corporation, "Hyper-V: Architecture", Retrieved From <<https://social.technet.microsoft.com/wiki/contents/articles/157.hyper-v-architecture.aspx>>, Jul. 27, 1014, 3 Pages.

Microsoft, Corporation, "Hypervisor Functional Specification Version 1.0a", Retrieved From <<https://web.archive.org/web/20120603214628/http://www.microsoft.com/en-us/download/details.aspx?id=5805>>, Jun. 3, 2012, 263 Pages.

(56) References Cited

OTHER PUBLICATIONS

Microsoft, Corporation, "Live Migration", Retrieved From <<https://www.microsoft.com/en-us/download/confirmation.aspx?id=40732>>, Jul. 27, 2014, 1 Page.

Microsoft, Corporation, "Poster Companion Reference: Hyper-V and Failover Clustering", Retrieved From <<https://download.microsoft.com/download/F/6/9/F6932D74-4ADD-4366-B2BE-22CE4D94E54F/Poster%20Companion%20Reference%20-%20Hyper-V%20Networking.pdf>>, Jul. 27, 2014, 14 Pages.

Microsoft, Corporation, "Poster Companion Reference: Hyper-V Networking", Retrieved From <<https://download.microsoft.com/download/F/6/9/F6932D74-4ADD-4366-B2BE-22CE4D94E54F/Poster%20Companion%20Reference%20-%20Hyper-V%20Networking.pdf>, Jul. 27, 2014, 12 Pages.

Microsoft, Corporation, "Poster Companion Reference: Hyper-V Replica", Retrieved From <<https://technet.microsoft.com/en-us/library/dn641212(v=ws.11).aspx>>, Mar. 17, 2014, 11 Pages.

Microsoft, Corporation, "Poster Companion Reference: Hyper-V Storage", Retrieved From <<https://download.microsoft.com/download/F/6/9/F6932074-4ADD-4366-62BE-22CE4D94E54F/Poster%20Companion%20Reference%20-%20Hyper-V%20Virtual%20Machine%20Mobility.pdf>>, Jul. 27, 2014, 12 Pages.

Microsoft, Corporation, "Poster Companion Reference: Hyper-V Virtual Machine Mobility", Retrieved From <<https://download.microsoft.com/download/F/6/9/F6932D74-4ADD-4366-B2BE-22CE4D94E54F/Poster%20Companion&20Reference%20-%20Hyper-V%20Virtual%20Machine%20Mobility.pdf>, Jul. 27, 2014, 12 Pages.

Microsoft, Corporation, "Scale-Out File Server and SMB Mini Poster", Retrieved From <<http://www.microsoft.com/download/details.aspx?id=41665>>, Jul. 27, 2014, 1 Page.

Microsoft, Corporation, "Session Modes", Retrieved From <<https://www.microsoft.com/en-us/download/confirmation.aspx?id=40732>>, Jul. 27, 2014, 1 Page.

Microsoft, Corporation, "Storage Spaces and Deduplication Mini Poster", Retrieved From <<http://www.microsoft.com/download/detaiis.aspx?id=41665>>, Jul. 27, 2014, 1 Page.

Microsoft, Corporation, "Understanding Storage Architecture Mini Poster", Retrieved From <<http://www.microsoft.com/download/details.aspx?id=41665>>, Jul. 27, 2014, 1 Page.

Microsoft, Corporation, "Upgrading Your Private Cloud", Retrieved From <<https://www.microsoft.com/en-us/download/confirmation.aspx?id=40732>>, Jul. 27, 2014, 1 Page.

Microsoft, Corporation, "Virtual Hard Disk and Cluster Shared Volumes Mini Poster", Retrieved From <<http://www.microsoft.com/download/details.aspx?id=41665>>, Jul. 27, 2014, 1 Page.

Microsoft, Corporation, "Virtual Hard Disk Sharing Mini Poster", Retrieved From <<http://www.microsoft.com/download/details.aspx?id=41665>>, Jul. 27, 2014, 1 Page.

Microsoft, Corporation, "Windows Server 2012 Hyper-V Component Architecture", Retrieved From <<https://www.microsoft.com/en-us/download/confirmation.aspx?id=40732>>, Jul. 27, 2014, 1 Page.

Microsoft, Corporation, "Windows Server 2012 R2 Hyper-V Component Architecture", Retrieved From <<https://www.microsoft.com/en-us/download/confirmation.aspx?id=40732>>, Jul. 27, 2014, 1 Page.

Microsoft, Corporation, "Windows Server 2012 R2; Private Cloud Storage and Virtualization: Cluster Shared Volumes and Scale-Out File Server and SMB and Virtual Hard Disk Sharing", Retrieved From <<http://www.microsoft.com/download/details.aspx?id=41665>>, Jul. 27, 2014, 1 Page.

Nance, et al., "Investigating the Implications of Virtual Machine Introspection for Digital Forensics", In International Conference on Availability, Reliability and Security, Mar. 16, 2009, pp. 1024-1029.

Patrascu, et al., "Beyond Digital Forensics. A Cloud Computing Perspective over Incident Response and Reporting View Document", In 8th International Symposium on Applied Computational Intelligence and Informatics, May 23, 2013, 6 Pages.

Patrascu, et al., "Logging Framework for Cloud Computing Forensic Environments", In 10th International Conference on Communications, May 29, 2014, 4 Pages.

"International Preliminary Report on Patentability Issued in PCT Application No. PCT/US2015/042753", dated Dec. 5, 2016, 11 Pages.

"International Search Report and Written Opinion Issued in PCT Application No. PCT/US2015/042753", dated Oct. 9, 2015, 11 Pages.

"Second Written Opinion Issued in PCT Application No. PCT/US2015/042753", dated Aug. 18, 2016, 10 Pages.

Thorpe, "Towards a Forensic-Based Service Oriented Architecture Framework for Auditing of Cloud Logs", In Proceedings of IEEE Ninth World Congress on Services, Jun. 28, 2013, 9 Pages.

V, et al., "Forensic Acquisition and Analysis of VMware Virtual Machine Artifacts", In Proceedings of International Multi-Conference on Automation, Computing, Communication, Control and Compressed Sensing, Mar. 22, 2013, 7 Pages.

Wen, et al., "Forensics-as-a-Service (FaaS): Computer Forensic Workflow Management and Processing Using Cloud", In Proceedings of Fourth International Conference on Cloud Computing, GRIDs, and Virtualization, May 27, 2013, 7 Pages.

Zhao, et al., "Virtual Machine Security Systems", In Advances in Computer Science and Engineering, Jan. 2009, 27 Pages.

* cited by examiner

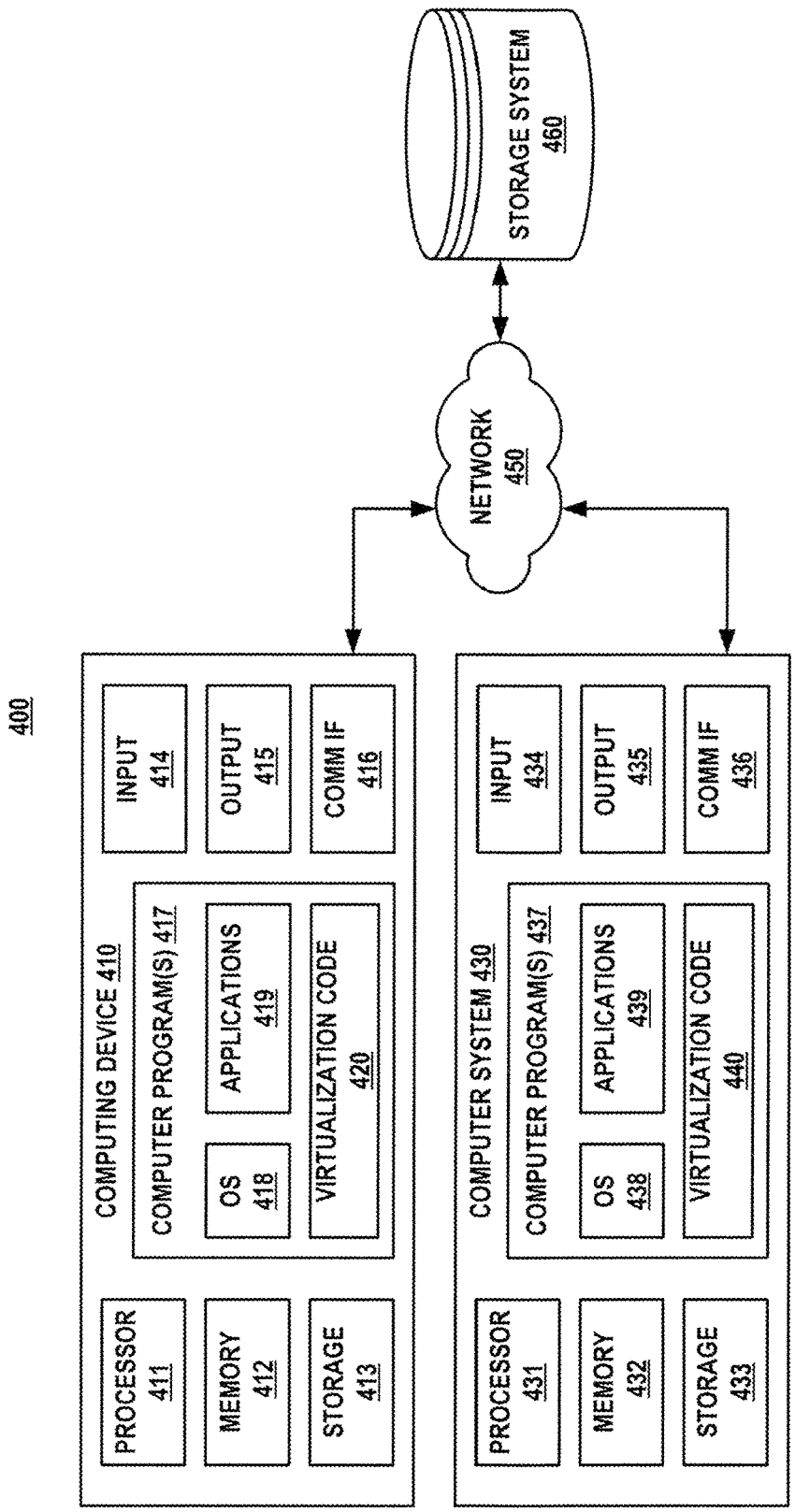

HYPERVISOR-HOSTED VIRTUAL MACHINE FORENSICS

CROSS-REFERENCE TO RELATED APPLICATIONS

The present application is a continuation of and claims priority of U.S. patent application Ser. No. 14/806,605, filed Jul. 22, 2015, which is based on and claims the benefit of U.S. provisional patent application Ser. No. 62/030,636, filed Jul. 30, 2014, the contents of which are hereby incorporated by reference in their entirety.

BACKGROUND

As datacenter solutions become dominantly virtual machine based incident responders in traditional enterprises, information technology environments as well as cloud service provider environments will face great challenges in conducting forensics acquisition and analysis at scale.

Traditional forensic tools work at the host level, often in user mode to acquire artifacts from the filesystem and memory via user-mode techniques and application programming interfaces (APIs) or, in some cases, kernel-mode drivers or shims These traditional solutions do not scale in large datacenter environments and can be compromised and thwarted by more sophisticated malware using anti-forensics capabilities and techniques.

When performing security investigation and forensic analysis in a small enterprise environment, analysis can be done on a host-by-host basis using tools for forensic acquisition and analysis. Performing forensic analysis for security investigation of cloud services may involve gathering data from hundreds of hosts for analysis. Going individually to each host to do forensic acquisition or analysis in those environments is untenable.

Some conventional tools load an agent on every host in the environment and use a centralized controller to reach out to the agents for acquiring forensics data and artifacts. However, loading an agent on every host does not scale well.

Furthermore, forensic acquisition and analysis of stored data does not provide live memory or current state of a running virtual machine.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

A computer system acquires forensics data from running virtual machines in a hypervisor-hosted virtualization environment. The computer system provides a forensics partition as an additional root virtual machine partition or child virtual machine partition. The forensics partition includes a forensics service application programming interface configured to target one or more virtual machines and acquire forensics data from a targeted virtual machine running in a particular child virtual machine partition. The forensics service application programming interface is configured to communicate via one or more inter-partition communication mechanisms such as an inter-partition communication bus, a hypercall interface, or forensics switch implemented by the hypervisor-hosted virtualization environment. The forensics service application programming interface can be exposed to a forensics tool as part of a cloud-based forensics service.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 4 illustrates an embodiment of an exemplary operating environment that can implement aspects of the described subject matter.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
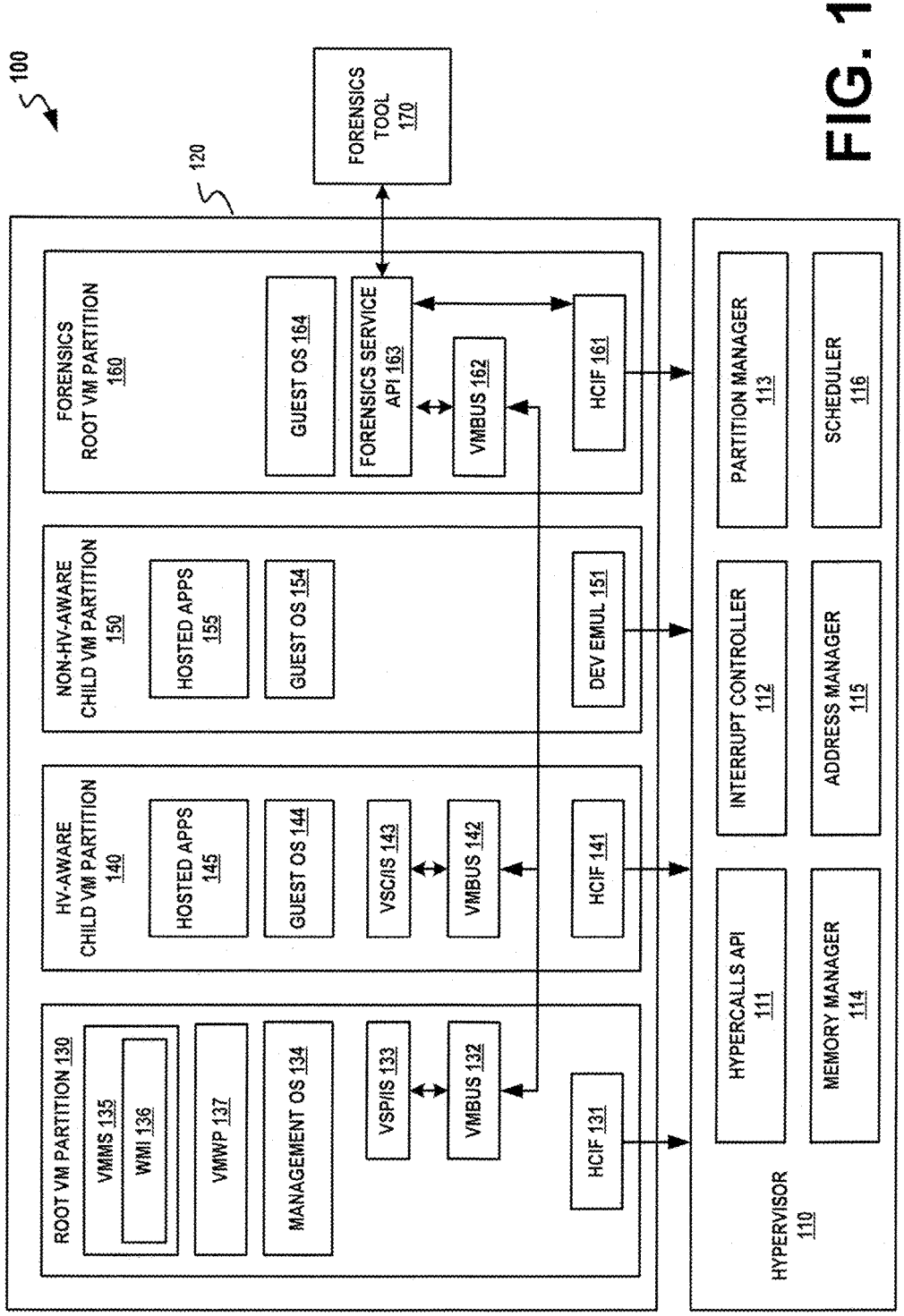
FIG. 1 illustrates an embodiment of an exemplary framework in accordance with aspects of the described subject matter.

FIG. 1 illustrates a virtualization framework 100 as an embodiment of an exemplary framework that can implement aspects of the described subject matter. It is to be appreciated that virtualization framework 100, or portions thereof, can be implemented by various computing devices and can be implemented by software, hardware, firmware or a combination thereof in various embodiments.

Implementations of virtualization framework 100 are described in the context of a computing device and/or a computer system configured to perform various steps, methods, and/or functionality in accordance with aspects of the described subject matter. It is to be appreciated that a computer system can be implemented by one or more computing devices. Implementations of virtualization framework 100 also are described in the context of "computer-executable instructions" that are executed to perform various steps, methods, and/or functionality in accordance with aspects of the described subject matter.

In general, a computing device and/or computer system can include one or more processors and storage devices (e.g., memory and disk drives) as well as various input devices, output devices, communication interfaces, and/or other types of devices. A computing device and/or computer system also can include a combination of hardware and software. It can be appreciated that various types of computer-readable storage media can be part of a computing device and/or computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computing device and/or computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

Virtualization framework 100 can be implemented by a computing device (e.g., server computer) and/or computer system. A server computer that implements virtualization framework 100 can include one or more processors that support hardware assisted virtualization. In one embodiment, virtualization framework 100 can be implemented by Microsoft® Hyper-V®, which provides server virtualization, implements a native hypervisor, and can create virtual machines. In other embodiments, virtualization framework 100 can be implemented by various suitable virtualization products such as VMware, Oracle VirtualBox, and so forth.

Virtualization framework 100 can be implemented in a server virtualization context for concurrently running multiple virtual servers instances on one physical host computer in isolated execution environments. Each virtual server can operate as if it is the only server running on a shared physical host server.

Virtualization framework 100 can be implemented in a network virtualization context for concurrently running multiple virtual network infrastructures on the same physical network. Each virtual network can operate as if it is the only network running on a shared physical network fabric.

Virtualization framework 100 can be implemented in cloud-computing environment. A server computer that supports the x64 architecture and implements virtualization framework 100 can host hundreds of virtual machines. A server computer that hosts hundreds of virtual machines can be deployed as one node in a cluster of a thousand or more virtual machines. A server computer that implements virtualization framework 100 can be deployed in a cluster hosted by a cloud-computing datacenter that that manages computing and storage resources of server computers and provisions resources to applications running in a cloud-computing environment.

A server computer that implements virtualization framework 100 can include one or more operating systems. Exemplary operating systems include, without limitation: a Microsoft® operating system (e.g., a Microsoft® Windows ® operating system, a Microsoft® Azure™ operating system), a Google® operating system (e.g., a Google® Chrome OS™ operating system or a Google® Android™ operating system), an Apple operating system (e.g., a Mac OS® or an Apple iOS™ operating system), a Linux® operating system, an open source operating system, or any other operating system suitable for running on a computing device, computer system, and/or processor-based device or system. It can be appreciated that a server computer that implements virtualization framework 100 can host multiple, different operating systems as guest operating systems.

As shown, virtualization framework 100 includes a hypervisor 110. When installed on a computing device (e.g., server computer) or computer system, hypervisor 110 can be configured to manage underlying hardware (e.g., one or more processors, memory, disk, NICs, etc.) of the computing device or computer system. Hypervisor 110 can run in a highly privileged mode (e.g., Ring -1). Hypervisor 110 can control and arbitrate access to underlying hardware.

Hypervisor 110 can manage a subset of core hardware facilities (e.g., logical processors, local Advanced Programmable Interrupt Controllers (APICs), system counters, system physical address space (e.g., RAM and device memory), I/O space, model specific register (MSR) space, etc.) to provide isolated execution environments. Hypervisor 110 can provide, support, and manage isolated execution environments referred to as partitions. Each partition can be implemented as an abstract container or logical unit for isolating processor and memory resources managed by hypervisor 110. Each partition can be allocated a set of hardware resources (CPU, memory, and devices) and virtual resources. Partitions can own or share hardware resources. Partitions can have policies on device access.

Partitions can provide isolated execution environments in which guest operating systems execute. As such, multiple isolated operating systems can be executed on a shared hardware platform. Partitions can include a root (e.g., parent) partition. A root partition can implement and run a management operating system such as a Microsoft® Windows® Server operating system or other suitable management operating system. A root partition can include a virtualization stack that provides direct access to underlying hardware devices.

A root or parent partition can operate to create one or more child partitions. Each child partition can host a child guest operating system. A child guest operating system can be a full-featured operating system or a special-purpose kernel. A child partition generally does not have access to the underlying physical hardware (e.g., processor, memory, disk, NICs, etc.) or handle processor interrupts. A child partition can run in a virtual memory address region that is private to the child partition. A child partition can be presented with a virtual view of hardware resources, and requests to virtual devices can be redirected to and handled by the root partition.

Hypervisor 110 can create and run virtual machines. A child partition can be associated with and/or implement a virtual machine created by hypervisor 110. A virtual machine can emulate a physical computing device or computer system as a software implementation that executes programs like a physical machine. A virtual machine can have one or more virtual processors. A virtual machine can provide a virtual system platform for executing a full-featured operating system. A partition can implement a virtualization stack for accessing emulated devices. A logical system can map to a partition, and logical devices can map to virtual devices within the partition.

Hypervisor 110 can implement and expose a hypercalls API 111 or other type of calling mechanism that partitions can use to access hypervisor 110. Calls from partitions to hypervisor 110 are referred to as hypercalls. Each hypercall can define a set of input and/or output parameters. A hypercall can be configured to perform a single action or to perform multiple actions.

Hypercalls can be sent to hypervisor 110 by a parent partition or a child partition. A partition can send a hypercall to hypervisor 110 to request an action and/or query for information (e.g., output parameters, statistics, registers, etc.). A root or parent partition can send a hypercall to hypervisor 110 to create a child partition. Hypercalls API 111 can implement a calling path from a partition to hypervisor 110 and a return path from hypervisor 110 to the calling partition.

Hypervisor 110 can provide and support various messaging capabilities. Messages can be sent by hypervisor 110 to a partition. Messages can be sent between partitions. Each message can have a message type, a source partition, and a message payload. Hypervisor 110 can provide and support inter-partition communication as messages and/or events. A message or event from a partition can be routed through hypervisor 110 for delivery to another partition.

Hypervisor can include an interrupt controller 112 configured to control and prioritize processor interrupts. Interrupt controller 112 can allow hypervisor 110 to handle interrupts to the processor and redirect interrupts to a partition. Interrupt controller can be implemented, for example, by an APIC or other suitable interrupt controller.

Hypervisor 110 can include a partition manager 113 for creating, managing, and deleting partitions. Partition manager 113 can allow hypervisor 110 to create and initialize a child partition in response to a hypercall from a root or parent partition. Each newly-created partition can be assigned a partition identifier and can be allocated memory and virtual resources.

Hypervisor 110 can include memory manager 114 for managing memory and access by partitions. Memory manager 114 can be implemented, for example, by memory service routines (MSRs) or other suitable memory manager.

Hypervisor 110 can include an address manager 115 for managing virtual network addresses allocated to each guest operating system. Address manager 115 can allow hypervisor 110 to perform address translation for mapping physical memory addresses to virtual address spaces used by partitions.

Hypervisor 110 can include a scheduler 116 configured to schedule the running of virtual processors on physical processors. Scheduler 116 can perform scheduling based on policy set by a root or parent partition.

Hypervisor-Hosted Virtualization Environment

Hypervisor 110 can be configured to provide a hypervisor-hosted virtualization environment 120. In various implementations, hypervisor-hosted virtualization environment 120 can implement one or more virtualized partitions.

Hypervisor-hosted virtualization environment 120 can include a root virtual machine (VM) partition 130 or root VM, a hypervisor-aware child VM partition 140 or enlightened child VM, and a non-hypervisor-aware child VM partition 150 or unenlightened child VM.

Root VM partition 130 can include a hypercall interface (HCIF) 131 for communicating with hypervisor 110. HCIF 131 can invoke hypercalls API 111 to send hypercalls from root VM partition 130 to hypervisor 110. HCIF 131 can be implemented by a wrapper library such as the Microsoft Windows® Hypervisor Interface Library (WinHV). HCIF 131 runs within root VM partition 130 and provides a wrapper interface or calling convention (e.g., high-level C-style calling convention) for invoking hypercalls API 111 and calling hypervisor 110 using standard calling conventions. Root VM partition 130 can operate as a parent partition and use HCIF 131 to call hypervisor to create child VM partitions 140, 150. HCIF 131 can run in kernel mode.

Root VM partition 130 can include a virtual machine bus (VMBus) 132. VMBus 132 can be implemented as a communication channel for inter-partition communication between root VM partition 130 and other hypervisor-aware or enlightened partitions of hypervisor-hosted environment. VMBus 132 can run in kernel mode.

Child VM partition 140 can be implemented as a hypervisor-aware or enlightened child partition. Child VM partition 140 can include HCIF 141 for invoking hypercalls API 111 to send hypercalls from child VM partition 140 to hypervisor 110. HCIF 141 can be implemented by a wrapper library such as the Microsoft Windows® Hypervisor Interface Library (WinHV). HCIF 141 can run in kernel mode.

Child VM partition 140 can include a VMBus 142 for communicating with root VM partition 130 and other hypervisor-aware or enlightened partitions of hypervisor-hosted environment. VMBus 142 can run in kernel mode. It is to be appreciated that hypervisor-hosted virtualization environment 120 can include numerous enlightened child partitions and that child VM partition 140 is shown as an example of one of such enlightened child partitions.

Child VM partition 150 can be implemented as a non-hypervisor-aware or unenlightened child partition. Child VM partition 150 can include a device emulation component 151 for communicating with hypervisor 110. Device emulation component 151 can run in kernel mode. It is to be appreciated that hypervisor-hosted virtualization environment 120 can include numerous unenlightened child partitions and that child VM partition 150 is shown as an example of one of such unenlightened child partitions.

Root VM partition 130 can include a virtualization service provider and/or integration services (VSP/IS) 133. VSP/IS 133 can handle requests from hypervisor-aware child partitions. Child VM partition 140 can include a virtualization service client and/or integration services (VSC/IS) 143. VSP/IS 133 can provide various virtualization services to VSC/IS 143 over VMBus 132, 142 to support child VM partition 140. VSC/IS 143 can consume virtualization services from VSP/IS 133. VCS/IS 143 can include various integration components for allowing child VM partition 140 to communicate with hypervisor 110, root VM partition 130, and other hypervisor-aware partitions via VMBus 142. VCS/IS 143 and VSP/IS 133 can operate in client-provider manner and can communicate using Windows Management Instrumentation (WMI) calls. VCS/IS 143 and VSP/IS 133 can run in kernel mode.

Various operating systems on the physical computer system that implements virtualization framework 100 can run on top of hypervisor 110. Root VM partition 130 can implement and run a management operating system 144 such as a Microsoft® Windows® Server operating system or other suitable hypervisor-aware parent guest operating system. Child VM partition 140 can implement and run a hypervisor-aware operating system (e.g., Windows® OS or Linux® operating system) as a guest operating system 144. Child VM partition 150 can implement and run a non-hypervisor aware operating system as a guest operating system 154.

Root VM partition 130 can include a virtual machine management service (VMMS) component 135 configured to manage the state of virtual machines in child partitions 140, 150. VMMS 135 can expose APIs implemented, for example, by WMI-based APIs 136 for managing and controlling virtual machines. Root VM partition 130 can include a virtual machine worker process (VMWP) component 137 that provides a separate worker process for each running virtual machine. Worker processes can provide virtual machine management services from Root VM partition 130 to child guest operating systems 144, 154 operating in child VM partitions 140, 150. Each virtual machine can have a worker process that runs in root VM partition 130 and implements code for saving state, accessing emulated devices, and controlling the virtual machine. VMMS 135, WMI 136, and VMWP component 137 can run in user mode.

Root VM partition 130 can include various drivers such as a virtualization infrastructure driver (VID) for providing partition management services, independent hardware vendor (IHV) drivers for managing interactions with host system hardware, and other drivers.

Child VM partition 140 can implement various hosted applications 145 that are run using guest operating system 144. Child VM partition 150 can implement various hosted applications 155 that are run using guest operating system 154.

Forensics Root VM

As shown in FIG. 1, hypervisor-hosted virtualization environment 120 includes a hypervisor-hosted forensics root VM partition 160 or forensics root VM. Forensics root VM partition 160 can be created and/or launched by hypervisor 110. Forensics root VM partition 160 can implement a forensics root VM as a dedicated VM for forensics acquisition and analysis with nominal impact to hypervisor 110 or root VM partition 130.

Forensics root VM partition 160 can be implemented as a privileged VM partition, similar in nature to root VM partition 130. Forensics root VM partition 160 can be an additional root partition having some degree of specialness or enhanced privilege with respect to child VM partitions 140, 150. For example, forensics root VM partition 160 can implement a virtualization stack that provides direct access to underlying hardware (e.g., memory) of the physical computer system that implements virtualization framework 100. Forensics root VM partition 160 can have many qualities like root VM partition 130 but will not operate as the root VM partition 130 or root VM. As such, forensics root VM partition 160 can be more privileged than a child VM partition but less privileged than root VM partition 130.

Forensics root VM partition 160 can include a HCIF 161 for communicating with hypervisor 110. HCIF 161 can invoke hypercalls API 111 to send hypercalls from forensics root VM partition 160 to hypervisor 110. HCIF 161 can be implemented by a wrapper library such as the Microsoft Windows® Hypervisor Interface Library (WinHV). HCIF 161 runs within forensics root VM partition 160 and provides a wrapper interface or calling convention (e.g., high-level C-style calling convention) for invoking hypercalls API 111 and calling hypervisor 110 using standard calling conventions. HCIF 161 can run in kernel mode.

Forensics root VM partition 160 can include VMBus 162 for inter-partition communication between forensics root VM partition 160 and other hypervisor-aware partitions of hypervisor-hosted virtualization environment 120 including root VM partition 130 and child VM partition 140. VMBus 162 can run in kernel mode. Forensics root VM partition 160 can implement and run a hypervisor-aware guest operating system 164 such as Microsoft® Windows® Server operating system or other suitable hypervisor-aware guest operating system.

Forensics root VM partition 160 can implement a privileged VM that is permitted access to hosted VMs via VMBus 162 and hypercalls API 111 directly. Forensics root VM partition 160 is capable of sending and receiving messages and/or events that are routed through hypervisor 110 to a destination partition.

Forensics root VM partition 160 can include a forensics service API 163 that can be invoked by a forensics tool 170. In one implementation, forensics tool 170 can be external to hypervisor-hosted virtualization environment 120. In other implementations, forensics tool 170 can be installed or implemented within forensics root VM partition 160. Forensics tool 170 can be implemented by an application and/or automated script (e.g., PowerShell script) that collects data from running hosted VMs via forensics service API 163.

Forensics tool 170 can call forensics service API 163 using WMI, another Windows® API, and/or other calling convention. In various implementations, forensics tool 170 can make calls to a familiar and/or expected interface without the need to rewrite interfaces or calling mechanisms. Forensics service API 163 can receive Windows® system calls for filesystem access, memory access, disk access, network access, and/or PowerShell remote access from forensics tool 170 and can convert such calls into messages and/or calls supported by inter-partition communication mechanisms.

Forensics service API 163 can be exposed to forensics tool 170 and can include functionality for requesting, receiving, and/or exposing forensics data from running hypervisor-hosted VMs using various inter-partition communication mechanisms. For instance, forensics service API 163 can include functionality for requesting, receiving, and/or exposing forensics data from running enlightened VMs via VMBus 162. Calls can be routed from forensics root VM partition 160 to targeted enlightened VMs via the VMBus 162, 142. Forensics data from VMs can be received over and/or exposed by VMBus 162.

Forensics service API 163 can be exposed to running enlightened VMs (e.g., child VM partition 140) via VMBus 162. In some implementations, enlightened VMs can call forensics service API 163 to supply forensics data in response to a request, message, and/or event.

Forensics service API 163 can include functionality for requesting, receiving, and/or exposing forensics data from running enlightened VMs (e.g., child VM partition 140) using VSCs and/or integration services. Enlightened partitions provide an I/O and hypervisor-aware kernel via the installation of integration services, which can include one or more VSCs that utilize the VMBus. As such, forensics service API 173 can request, receive, and/or expose forensics data from enlightened VMs using VSCs and/or integration services. Forensics service API 163 can request, receive, and/or expose forensics data by communicating with running VMs using WMI calls.

Forensics service API 163 can include functionality for requesting, receiving, and/or exposing forensics data from running VMs using hypercalls to hypervisor 110 via HCIF 161. A call can be made to hypervisor 110 and forensics data for running VMs can be received from hypervisor 110. Forensics service API 163 can include functionality for requesting, receiving, and/or exposing forensics data from running VMs using messages and/or events routed through hypervisor 110.

In some implementations, calls and responses can be made and received in different ways. A call to request forensics data can be made using one mechanism, and forensics data can be received via another mechanism. A call can be sent over one interface, and forensics data collected over another interface. A calling interface can be exposed as one type of interface (e.g., network interface), and a receiving interface can be exposed as another type of interface (e.g., network attached storage interface, PowerShell remoting interface, etc.).

The root VM partition 130 is highly privileged. In one implementation, root VM partition 130 supports the infrastructure that makes the calls, but forensics tool 170 does not directly access root VM partition 130. In some implementations, requests for forensics data such as hypercalls (e.g., WinHv calls) and/or VMBus calls from forensics root VM partition 160 can be routed through root VM partition 130.

Forensics root VM partition 160 can implement a Windows® virtual machine having WMI functionality and the ability to employ Windows® APIs such as network, disk, etc. Forensic tool 170 can leverage the network, disk, or other Windows® APIs and tap into them to do its work. The VMBus 162 in forensics root VM partition 160 is exposed so that calls can be made using VMBbus 162 and/or WMI to do forensic investigation on a target.

Forensics tool 170 or an investigator can log on or be directed to forensics root VM partition 160 and can be presented with forensics service API 163 that can be called by forensics tool 170. Calls from forensics tool 170 are arbitrated at the hypervisor level. The forensics data is acquired from the targeted host and presented back to the forensic root VM partition 160. For example, the registry hive from a particular host can be obtained by making a call to forensics root VM partition 160, which obtains the data from the particular host and provides it back to forensic tool 170.

Forensics service API 163 can include functionality for allowing forensics tool 170 to target one or more running hosted VMs and to select various types of forensics data for acquisition and/or analysis. Non-limiting examples of forensic artifacts that can be requested and/or analyzed by forensics tool 170 include: host/VM filesystem artifacts, host/VM network artifacts, host/VM memory artifacts, and host/VM event log artifacts.

Forensic analysis of one or more targeted hosts/VMs can require types of information obtained from the filesystem of a host/VM. This activity can include both acquisition of actual data for deeper analysis or actual analysis activity directly via the VM interface. Non-limiting examples of acquiring and analyzing host/VM filesystem artifacts include: acquisition of Master File Table (MFT) activity and detection of anomalous MFT activity, acquisition of file times and detection of suspicious file time anomalies, acquisition and validation of file hashes, acquisition and analysis of Autostart Extensibility Points (ASEPs) and autoruns, acquisition and analysis of file download-open-creation-deletion information, acquisition and analysis of program execution and usage information, packing/entropy analysis, and stack rank/frequency analysis of artifacts.

Network analysis at the host/VM level can involve acquiring and analyzing host/VM network artifacts including, without limitation: acquisition and analysis of Address Resolution Protocol (ARP) cache data, acquisition and analysis of Domain Name System (DNS) cache data, acquisition and analysis of network connection data, and capture and analysis of packet data.

Host/VM memory analysis provides an investigator with the ability to acquire and analyze information about the operating system and running processes. This capability can involve acquiring memory data for analysis by forensics tool 170 or direct analysis via exposure of forensics interface 163 to forensics tool 170. Non-limiting examples of acquiring and analyzing host/VM memory artifacts include: acquisition of process information and identification of suspicious processes, acquisition and analysis of dynamic link library (DLL) processes and handling, acquisition and analysis of code injection behavior, acquisition and analysis of kernel hooking (e.g., rootkit behavior), acquisition and analysis of process memory dumping and mapping.

Host event logs are a key tool for forensic analysis to determine various activities on a host/VM. Event log sources can be acquired and analyzed from a host/VM or across an entire host/VM population. Non-limiting examples of acquiring and analyzing host/VM event log artifacts include: acquisition and analysis of scheduled tasks logs, acquisition and analysis of logon events, acquisition and analysis of account activities, acquisition and analysis of system policies changes, acquisition and detection of suspicious services and program activities, acquisition and analysis of event timeline data.

In implementations where user-related data is utilized, providers and consumers of such user-related data can employ a variety of mechanisms in the interests of user privacy and information protection. Such mechanisms can include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

Hypervisor-Hosted Forensics Switch

Figure 2:
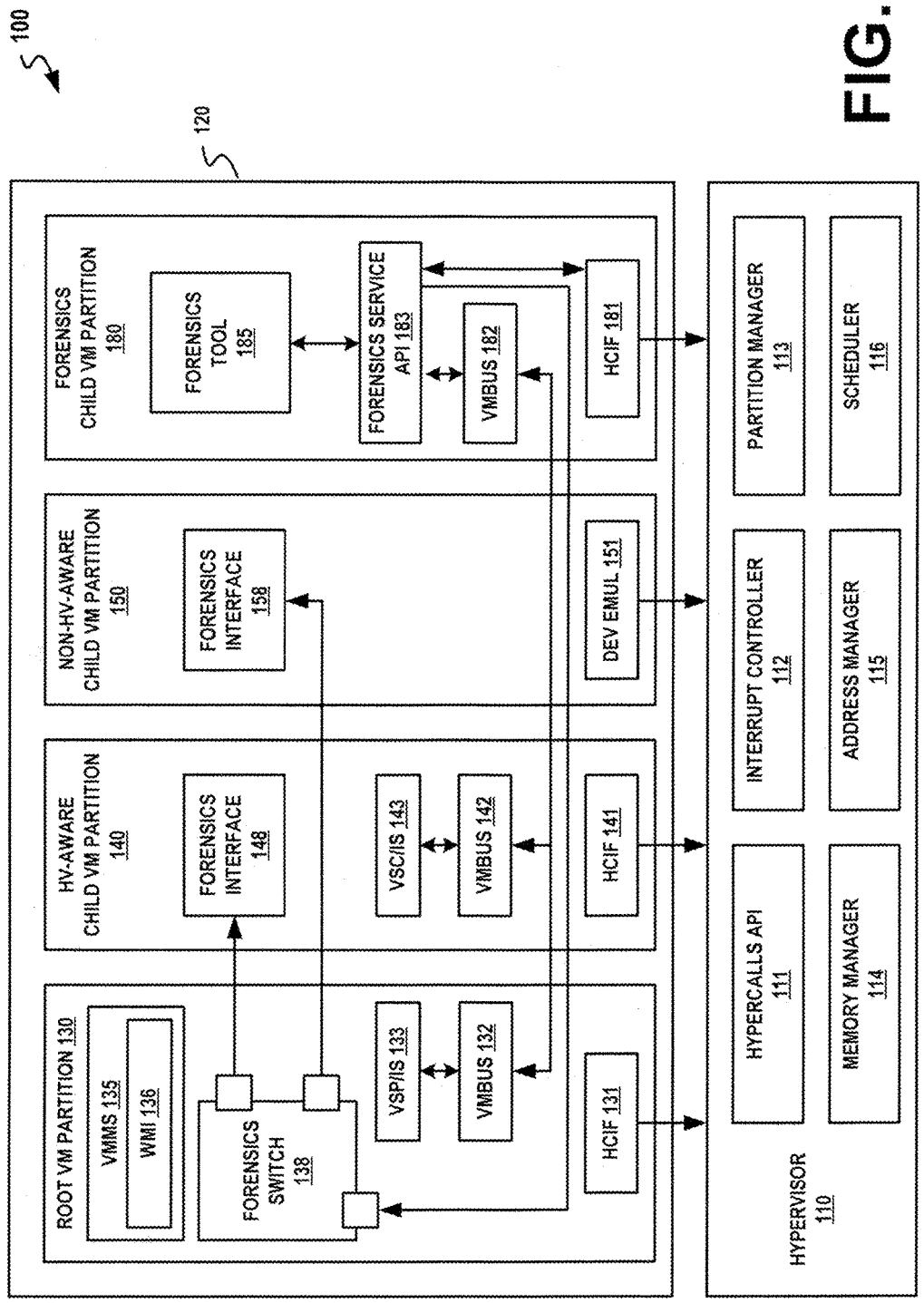
FIG. 2 illustrates an embodiment of an exemplary framework in accordance with aspects of the described subject matter.

As shown in FIG. 2, hypervisor-hosted virtualization environment 120 includes a hypervisor-hosted forensics child VM partition 180 or forensics child VM. Forensics child VM partition 180 can be created and/or launched by hypervisor 110. Forensics child VM partition 180 can implement a forensics child VM as a dedicated VM for forensics acquisition and analysis with nominal impact to hypervisor 110 or root VM partition 130.

In one implementation, forensics child VM partition 180 can be an additional child VM partition that is not special in terms of privilege. Alternatively, forensics child VM partition 180 can be implemented as a privileged VM partition, similar in nature to forensics root VM partition 160. Typically, forensics child VM partition 180 will be an enlightened VM capable of using hypervisor-supported inter-partition communication mechanisms and Windows® features.

Forensics child VM partition 180 can include a HCIF 181 for communicating with hypervisor 110. HCIF 181 can invoke hypercalls API 111 to send hypercalls from forensics child VM partition 180 to hypervisor 110. HCIF 181 can be implemented by a wrapper library such as the Microsoft Windows® Hypervisor Interface Library (WinHV). HCIF 181 runs within forensics child VM partition 180 and provides a wrapper interface or calling convention (e.g., high-level C-style calling convention) for invoking hypercalls API 111 and calling hypervisor 110 using standard calling conventions. HCIF 181 can run in kernel mode.

Forensics child VM partition 180 can include VMBus 182 for inter-partition communication between forensics child VM partition 180 and other hypervisor-aware partitions of hypervisor-hosted virtualization environment 120 including root VM partition 130 and child VM partition 140. VMBus 182 can run in kernel mode. Forensics child VM partition 180 can implement and run a hypervisor-aware guest operating system such as Microsoft® Windows® Server operating system or other suitable hypervisor-aware guest operating system.

Forensics child VM partition 180 can implement a VM that is permitted access to hosted VMs via VMBus 182 and hypercalls API 111 directly. Forensics child VM partition 180 is capable of sending and receiving messages and/or events that are routed through hypervisor 110 to a destination partition. The forensics child VM can have access to WMI, window APIs, network, disk, etc.

Forensics child VM partition 180 can include a forensics service API 183 that can be invoked by a forensics tool 185. In one implementation, forensics child VM partition 180 runs forensic tool 185. For example, an investigator can spin up forensics child VM partition 180 and install forensics tool 185. In other implementations, forensics tool 185 can be external to forensics child VM partition 180. Forensics tool 185 can be implemented by an application and/or automated script (e.g., PowerShell script) that collects data from running hosted VMs via forensics service API 183.

The root VM partition 130 is highly privileged. In one implementation, access to forensics switch 138 in root VM partition 130 can be restricted to forensics tool 185 in forensics child VM partition 180. Requests for forensics data such as hypercalls (e.g., WinHv calls) and/or VMBus calls from forensics child VM partition 180 can be routed through root VM partition 130. In some implementations, however, forensics switch 138 can be exposed to a forensics tool (e.g., forensics tool 170) that is external to hypervisor-hosted virtualization environment 120.

Forensics tool 185 can call forensics service API 183 using WMI, another Windows® API, and/or other calling convention. In various implementations, forensics tool 185 can make calls to a familiar and/or expected interface without the need to rewrite interfaces or calling mechanisms. Forensics service API 183 can receive Windows® system calls for filesystem access, memory access, disk access, network access, and/or PowerShell remote access from forensics tool 185 and can convert such calls into messages and/or calls supported by inter-partition communication mechanisms. The forensics child VM partition 180 needs to consume when it makes a request with forensics tool 185 for acquiring or exposing data from one or more target hosts. Forensics data can be returned back in a format that forensics tool 185 can consume.

Forensics service API 183 can be exposed to forensics tool 185 and can include functionality for requesting, receiving, and/or exposing forensics data from running hypervisor-hosted VMs using various inter-partition communication mechanisms. For instance, forensics service API 183 can include functionality for requesting, receiving, and/or exposing forensics data from running enlightened VMs via VMBus 182. Calls can be routed from forensics child VM partition 180 to targeted enlightened VMs via the VMBus 182, 142. Forensics data from VMs can be received over and/or exposed by VMBus 182.

Forensics service API 183 can be exposed to running enlightened VMs (e.g., child VM partition 140) via VMBus 182. In some implementations, enlightened VMs can call forensics service API 183 to supply forensics data in response to a request, message, and/or event.

Forensics service API 183 can include functionality for requesting, receiving, and/or exposing forensics data from running enlightened VMs (e.g., child VM partition 140) using VSCs and/or integration services. Enlightened partitions provide an I/O and hypervisor-aware kernel via the installation of integration services, which can include one or more VSCs that utilize the VMBus. As such, forensics service API 183 can request, receive, and/or expose forensics data from enlightened VMs using VSCs and/or integration services. Forensics service API 183 can request, receive, and/or expose forensics data by communicating with running VMs using WMI calls.

Forensics service API 183 can include functionality for requesting, receiving, and/or exposing forensics data from running VMs using hypercalls to hypervisor 110 via HCIF 181. A call can be made to hypervisor 110 and forensics data for running VMs can be received from hypervisor 110. Forensics service API 183 can include functionality for requesting, receiving, and/or exposing forensics data from running VMs using messages and/or events routed through hypervisor 110.

Forensics child VM partition 180 can implement a Windows® virtual machine having WMI functionality and the ability to employ Windows® APIs such as network, disk, etc. Forensic tool 185 can leverage the network, disk, or other Windows® APIs and tap into them to do its work. The VMBus 182 in forensics child VM partition 180 is exposed so that calls can be made using VMBbus 182 and/or WMI to do forensic investigation on a target.

As shown, a forensics switch 138 is implemented within root VM partition 130. Forensics switch 138 is accessible to forensics child VM partition 180 and is able to access VMs running in child VM partitions 140, 150. Forensics tool 185 or other service can interface with forensics switch 138 and requests acquisition and return of certain types of forensic artifacts from the VMs for storage or analysis. Forensics switch 138 can be a robust implementation that facilitates access to unenlightened child partitions which does not support VMBus functionality.

Forensics switch 138 can be built into root VM partition 130 as a different construct or shim in root VM partition 130. Forensics switch 138 is exposed to forensics service API 183. Forensics switch 138 can expose mechanism to forensics child VM 180 via an agent, API, or another mechanism (disk, network mechanism, etc.) that forensics tool 185 can use. Forensics service API 183 can interface with forensics switch 138. For instance, forensics switch 138 can route calls from forensics service API 183 to target VMs and provide forensics data back to forensic child VM partition 180 for analysis.

In various implementations, a forensics switch or interface can be added to each child VM/partition dynamically, allowing access to the necessary system, memory, network and disk resources of the child VM for the purposes of forensic acquisition and analysis. This mechanism supports hypervisor "hot-plug" capability.

As shown, child VM partitions 140, 150 are instrumented with forensics interfaces 148, 158, respectively. Forensic switch 138 is loaded and includes acquisition targets that directly map to running VMs. Acquisition targets are available to an investigator via forensics service API 183. Forensics tool 185 can target a host and acquire forensics data via forensics service 183 and forensics interfaces 148, 158. A call response can be made back to forensics switch 138 via forensics interfaces 148, 158. Forensics switch 138 can receive a request, collect forensics data from a host/VM, and send forensics data back to forensics tool 185.

At the hypervisor level, forensic switch 138 can be the arbiter for forensics tool 185. Calls to forensics switch 138 can be made by VMBus calls, WMI calls, hypercalls (e.g., WinHv calls), messages, events, integration services calls, virtualization clients/provider, etc. WMI can be used with forensics tool 185 as another communication interface. Hypercalls and VMBus can be used for VM communication. In addition, messages, calls, events, VSP/IS, VSC/IS, WIN API, and so forth can be used for inter-partition communication. Forensics data can be exposed as network access or Windows® API call.

In some implementations, forensics switch 138 can work in conjunction with VMBus 182. For example, a call requesting forensics data from one or more VMs can be made over VMBus 182, 132. The call to an enlightened VM running in child VM partition 140 can be routed by forensics switch 138 to forensic interface 148 over VMBus 132, 142. Forensics data from an enlightened VM running in child VM partition can be routed from forensics interface 148 to forensics switch 138 over VMBus 142, 132 and can be routed from forensics switch 138 to forensics service API 183 over VMBus 132, 182.

In some implementations, calls and responses can be made and received in different ways. A call to request forensics data can be made using one mechanism, and forensics data can be received via another mechanism. A call can be sent over one interface, and forensics data collected over another interface. A calling interface can be exposed as one type of interface (e.g., network interface), and a receiving interface can be exposed as another type of interface (e.g., network attached storage interface, PowerShell remoting interface, etc.). In some cases, an enlightened VM running in child VM partition 148 can receive a call from forensics switch 138 and respond by exposing and/or providing forensics data via VMBus 142, 182 or using a hypercall (e.g., message, event, etc.) through hypervisor 110 without routing the forensics data back through forensics switch 138.

Forensics tool 185 or an investigator can log on or be directed to forensics child VM partition 180 and can be presented with forensics service API 183 that can be called by forensics tool 180. Calls from forensics tool 185 are arbitrated at the hypervisor level. The forensics data is acquired from the targeted host and presented back to the forensic child VM partition 180.

Forensics service API 183 can include functionality for allowing forensics tool 185 to target one or more running hosted VMs and to select various types of forensics data for acquisition and/or analysis. The information exists on the target hosts, and the forensic investigator makes a request to collect and/or expose forensics data. Forensics data can exist or be instantiated in disk, registry, memory, and/or other Windows® data structures. Non-limiting examples of forensic artifacts that can be requested and/or analyzed by forensics tool 185 include: host/VM filesystem artifacts, host/VM network artifacts, host/VM memory artifacts, and host/VM event log artifacts, as described above.

Hypervisor-Hosted Forensic Analysis and Artifact Acquisition

Various implementations for hypervisor-hosted forensics analysis are provided. One implementation provides a dedicated forensics root VM partition 160. Another implementation provides a hypervisor-hosted forensics switch 138 that allows root VM and/or hypervisor access to child partitions for the purpose of acquiring and analyzing host artifacts in a scalable manner from a single host/VM to thousands of hosts/VMs. It is to be appreciated that particular features, structures or characteristics which are described in connection with one implementation can be implemented in connection with other implementations.

Hypervisor-based forensic artifact acquisition and analysis can leverage and/or extend capabilities for current hypervisor architecture and make use of methods and APIs available for communications between the hypervisor and VM/child partitions. For instance, VMBus and other technologies allow interfacing with running VM hosts and either acquire the data or analyze data on the hosts while the hosts are running. Thousands of hosts can be examined for the existence of a particular characteristic. Frequency analysis can be done on observed characteristics. These mechanisms can be leveraged for various host and network forensic acquisition and analysis activities against a VM/partition or population of VMs/partitions.

Incident responders and security analysts need a scalable acquisition and analysis solution that can tap into and acquire host/VM information and artifacts at the hypervisor level from virtual machines, allowing greater scale of acquisition and analysis while mitigating sophisticated malware anti-forensics and hiding tactics.

Forensics root VM partition 160 and/or forensics switch 138 can be utilized for performing data acquisition and forensics analysis at the hypervisor level and can avoid the need to install agents or load tools on each host. Forensics switch 138 also provides advantages for dynamic addition of forensics capability to VMs and can support unenlightened child VM partitions.

Forensic analysis on VMs can be offered as a service. A service running at the hypervisor level can talk to hundreds of running hosts to acquire forensics data. From an analysis of scale perspective, hundreds of VMs can be investigated for suspicious network connections. A call could be made to hundreds of VMs to request their network connections list. A frequency analysis of network connections can be performed across the hosts to identify anomalous connections. Likewise, a call for registry contents can be made, and a frequency cluster analysis on files can be performed to identify candidates for investigation.

Cloud service providers can leverage this functionality to conduct large scale forensics acquisition that can accelerate their security incident investigations. Additionally, these features provide the ability to offer forensics as a service (FaaS) as an option to customers. Forensics data acquisition and analysis can be offered as part of a cloud service. A cloud service provider can offer a forensics service as a separate service or add-on.

A forensics service can be offered as a feature to allow customers to do forensic acquisition and analysis on any of their hosted VMs in the cloud. A cloud computing environment provider can offer forensics as a service so that customers can do their own forensic analysis on their own VMs. A cloud service providers can offer scalable forensics acquisition and analysis as a service by building tenant/customer self-service interfaces. For example, a centralized hypervisor-supported forensics switch can be permission accessed to customers. Alternatively or additionally, a custom forensics switch targeted only to the VMs of a particular customer can be provided to a FaaS customer.

Exemplary Process

Figure 3:
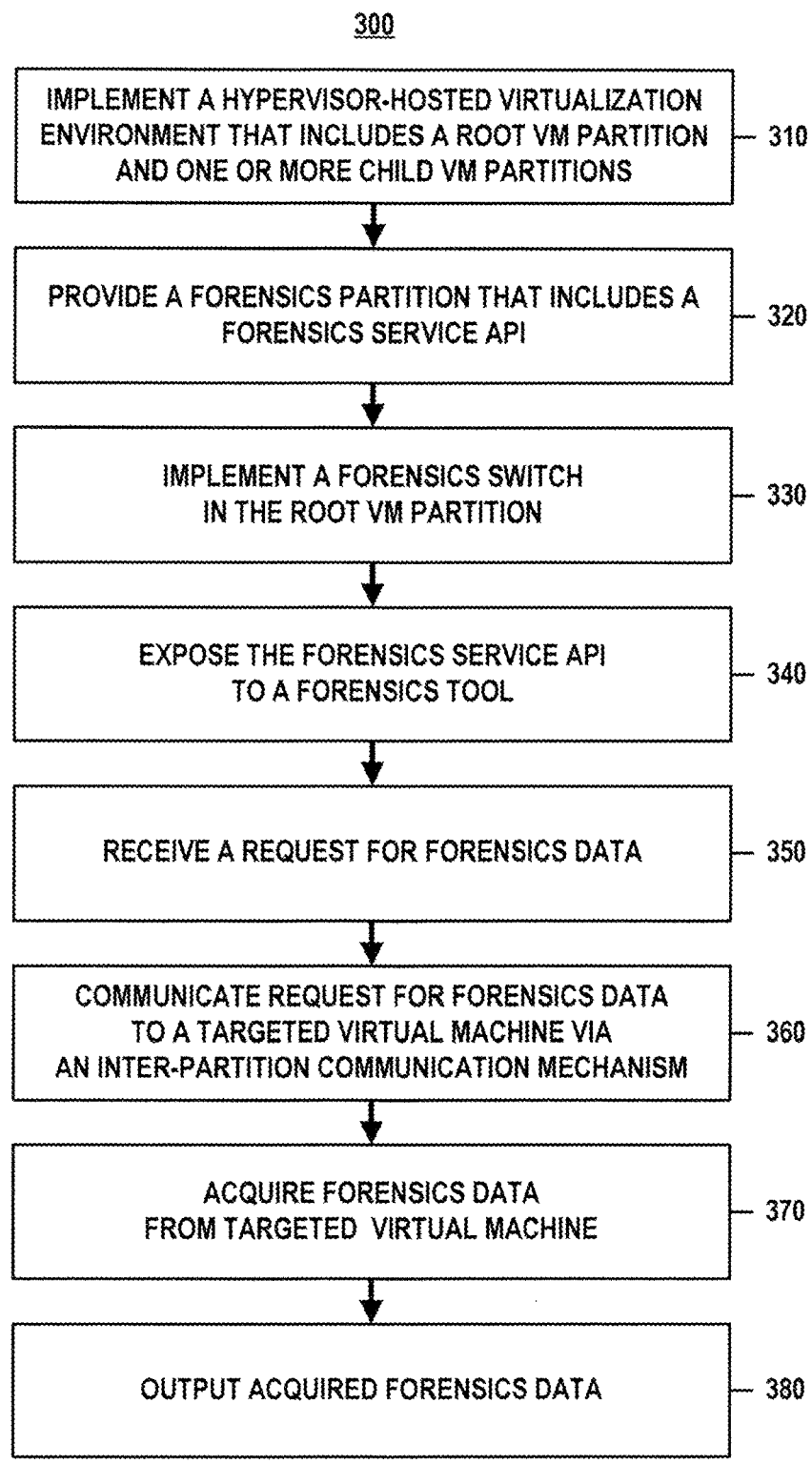
FIG. 3 illustrates an embodiment of an exemplary process in accordance with aspects of the described subject matter.

Referring to FIG. 3, with continuing reference to the foregoing figures, a computer-implemented method 300 is illustrated as an embodiment of an exemplary process in accordance with aspects of the described subject matter. Computer-implemented method 300, or portions thereof, can be performed by one or more computing devices, a computer system, computer-executable instructions, software, hardware, firmware or a combination thereof in various embodiments. For example, computer-implemented method 300 can be performed by a computer system that implements virtualization framework 100.

At 310, a computer system can implement a hypervisor-hosted virtualization environment that includes a root partition and one or more child virtual machine partitions. For example, hypervisor-hosted virtualization environment 120 can be implemented and include root VM partition 130 and child VM partitions 140, 150.

At 320, the computer system can provide a forensics partition that includes a forensics service application programming interface. As an example, forensics root VM partition 160 can be provided and include forensics service API 163. As another example, forensics child VM partition 180 can be provided and include forensics service API 183.

At 330, the computer system can implement a forensics switch in the root VM partition. For example, forensics switch 138 can be implemented in root VM partition 130. Forensics switch 138 can interconnect forensics service API 183 to child VM partitions 140, 150. Enlightened child VM partition 140 can include forensics interface 148 that is connected to forensics switch 138. Unenlightened child VM partition 150 can include forensics interface 158 that is connected to forensics switch 138. A forensics interface can be dynamically added to a child virtual machine partition and connected to forensics switch 138.

At 340, the computer system can expose the forensics service application programming interface to a forensics tool. As an example, forensics service API 163 can be exposed to forensics tool 170. As another example, forensics service API 183 can be exposed to forensics tool 185. Forensics service API 163 and/or forensics service API 183 can exposed as part of a cloud-based forensics service.

At 350, the computer system can receive a request for forensics data. For example, forensics service API 163 and/or forensics service API 183 can receive a request for forensics data. The request for forensics data can be received from forensics tool 170 or forensics tool 185. The request for forensics data can be targeted to one or more virtual machines running in child VM partitions.

At 360, the computer system can communicate the request for forensics data to a targeted virtual machine via an inter-partition communication mechanism. As an example, the request for forensics data can be communicated over an inter-partition bus (e.g., VMBus) that is implemented by the forensics partition and the particular child virtual machine partition which is running the targeted virtual machine. As another example, the request for forensics data can be communicated to the targeted virtual machine via hypervisor 110 using a hypercall interface (e.g., HCIF) that is implemented by the forensics partition and that is configured to invoke hypercalls API 111 of hypervisor 110. As a further example, the request for forensics data can be communicated through forensics switch 138 that is implemented by root VM partition 130 and that interconnects forensics service API 183 and the particular child virtual machine partition which is running the targeted virtual machine.

At 370, the computer system can acquire forensics data from one or more targeted virtual machines. The forensics data can include one or more of: filesystem artifacts, network artifacts, memory artifacts, and event log artifacts. The forensics data can be received and/or exposed via one or more inter-partition communication mechanisms supported by hypervisor-hosted virtualization environment 120.

At 380, the computer system can output acquired forensics data. The acquired forensics data can be output or presented as one or more interactive user interfaces, web documents, and/or web pages, as a viewable electronic document, and/or as a printed document. When provided in an interactive format, the output can include functionality for navigating to portions that correspond to different hosted virtual machines and different forensics artifacts for each hosted virtual machine. The output can include or link to forensic analysis information pertaining to hosted virtual machines or forensic artifacts. Acquired forensics data can be presented in a user interface that provides functionality for searching, filtering, and/or sorting the forensics data based on a single criterion or combination of criteria.

Exemplary Operating Environment

Aspects of the described subject matter can be implemented for and/or by various operating environments, computer networks, platforms, frameworks, computer architectures, and/or computing devices. Aspects of the described subject matter can be implemented by computer-executable instructions that can be executed by one or more computing devices, computer systems, and/or processors.

In its most basic configuration, a computing device and/or computer system can include at least one processing unit (e.g., single-processor units, multi-processor units, single-core units, and/or multi-core units) and memory. Depending on the exact configuration and type of computer system or computing device, the memory implemented by a computing device and/or computer system can be volatile (e.g., random access memory (RAM)), non-volatile (e.g., read-only memory (ROM), flash memory, and the like), or a combination thereof.

A computing device and/or computer system can have additional features and/or functionality. For example, a computing device and/or computer system can include hardware such as additional storage (e.g., removable and/or non-removable) including, but not limited to: solid state, magnetic, optical disk, or tape.

A computing device and/or computer system typically can include or can access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) can be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter can be implemented by computer-executable instructions stored on one or more computer-readable storage media. Computer-executable instructions can be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Peri®, C, Objective-C, C++, C#/.net, and/or others.

A computing device and/or computer system can include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device can provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device can be configured to receive and respond to input in various ways depending upon implementation. Responses can be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system can include one or more communication interfaces that allow communication between and among other computing devices and/or computer systems. Communication interfaces can be used in the context of network communication between and among various computing devices and/or computer systems. Communication interfaces can allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces can be used in the context of accessing, obtaining data from, and/or cooperating with various types of resources.

Communication interfaces also can be used in the context of distributing computer-executable instructions over a network or combination of networks. For example, computer-executable instructions can be combined or distributed utilizing remote computers and storage devices. A local or terminal computer can access a remote computer or remote storage device and download a computer program or one or more parts of the computer program for execution. It also can be appreciated that the execution of computer-executable instructions can be distributed by executing some instructions at a local terminal and executing some instructions at a remote computer.

A computing device can be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device can be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also can be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device can include and/or run one or more computer programs implemented, for example, by software, firmware, hardware, logic, and/or circuitry of the computing device. Computer programs can be distributed to and/or installed on a computing device in various ways. For instance, computer programs can be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device can include one or more operating systems. Exemplary operating systems include, without limitation: a Microsoft® operating system (e.g., a Microsoft® Windows ® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device can include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device can include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system can be implemented by a computing device, such as a server computer, or by multiple computing devices configured to implement a service in which one or more suitably-configured computing devices perform one or more processing steps. A computer system can be implemented as a distributed computing system in which components are located on different computing devices that are connected to each other through network (e.g., wired and/or wireless) and/or other forms of direct and/or indirect connections. A computer system also can be implemented via a cloud-based architecture (e.g., public, private, or a combination thereof) in which services are delivered through shared datacenters. For instance, a computer system can be implemented by physical servers of a datacenter that provide shared computing and storage resources and that host virtual machines having various roles for performing different tasks in conjunction with providing cloud-based services. Exemplary virtual machine roles can include, without limitation: web server, front end server, application server, database server (e.g., SQL server), domain controller, domain name server, directory server, and/or other suitable machine roles. Some components of a computer system can be disposed within a cloud while other components are disposed outside of the cloud.

FIG. 4 illustrates an operating environment 400 as an embodiment of an exemplary operating environment that can implement aspects of the described subject matter. It is to be appreciated that operating environment 400 can be implemented by a client-server model and/or architecture as well as by other operating environment models and/or architectures in various embodiments.

Operating environment 400 includes a computing device 410, which can implement aspects of the described subject matter. Computing device 410 includes a processor 411 and memory 412. Computing device 410 also includes additional hardware storage 413. It is to be understood that computer-readable storage media includes memory 412 and hardware storage 413.

Computing device 410 includes input devices 414 and output devices 415. Input devices 414 can include one or more of the exemplary input devices described above and/or other type of input mechanism and/or device. Output devices 415 can include one or more of the exemplary output devices described above and/or other type of output mechanism and/or device.

Computing device 410 contains one or more communication interfaces 416 that allow computing device 410 to communicate with other computing devices and/or computer systems. Communication interfaces 416 also can be used in the context of distributing computer-executable instructions.

Computing device 410 can include and/or run one or more computer programs 417 implemented, for example, by software, firmware, hardware, logic, and/or circuitry of computing device 410. Computer programs 417 can include an operating system 418 implemented, for example, by one or more exemplary operating systems described above and/or other type of operating system suitable for running on computing device 410. Computer programs 417 can include one or more applications 419 implemented, for example, by one or more exemplary applications described above and/or other type of application suitable for running on computing device 410.

Computer programs 417 can be configured via one or more suitable interfaces (e.g., API or other data connection) to communicate and/or cooperate with one or more resources. Examples of resources include local computing resources of computing device 410 and/or remote computing resources such as server-hosted resources, cloud-based resources, online resources, remote data stores, remote databases, remote repositories, web services, web sites, web pages, web content, and/or other types of remote resources.

Computer programs 417 can implement computer-executable instructions that are stored in computer-readable storage media such as memory 412 or hardware storage 413, for example. Computer-executable instructions implemented by computer programs 417 can be configured to work in conjunction with, support, and/or enhance one or more of operating system 418 and applications 419. Computer-executable instructions implemented by computer programs 417 also can be configured to provide one or more separate and/or stand-alone services.

Computing device 410 and/or computer programs 417 can implement and/or perform various aspects of the described subject matter. As shown, computing device 410 and/or computer programs 417 can include virtualization code 420. In various embodiments, virtualization code 420 can include computer-executable instructions that are stored on a computer-readable storage medium and configured to implement one or more aspects of the described subject matter. By way of example, and without limitation, virtualization code 420 can implement one or more aspects of virtualization framework 100 and/or perform one or more aspects of computer-implemented method 300.

Operating environment 400 includes a computer system 430, which can implement aspects of the described subject matter. Computer system 430 can be implemented by one or more computing devices such as one or more server computers. Computer system 430 includes a processor 431 and memory 432. Computer system 430 also includes additional hardware storage 433. It is to be understood that computer-readable storage media includes memory 432 and hardware storage 433.

Computer system 430 includes input devices 434 and output devices 435. Input devices 434 can include one or more of the exemplary input devices described above and/or other type of input mechanism and/or device. Output devices 435 can include one or more of the exemplary output devices described above and/or other type of output mechanism and/or device.

Computer system 430 contains one or more communication interfaces 436 that allow computer system 430 to communicate with various computing devices (e.g., computing device 410) and/or other computer systems. Communication interfaces 436 also can be used in the context of distributing computer-executable instructions.

Computer system 430 can include and/or run one or more computer programs 437 implemented, for example, by software, firmware, hardware, logic, and/or circuitry of computer system 430. Computer programs 437 can include an operating system 438 implemented, for example, by one or more exemplary operating systems described above and/or other type of operating system suitable for running on computer system 430. Computer programs 437 can include one or more applications 439 implemented, for example, by one or more exemplary applications described above and/or other type of application suitable for running on computer system 430.

Computer programs 437 can be configured via one or more suitable interfaces (e.g., API or other data connection) to communicate and/or cooperate with one or more resources. Examples of resources include local computing resources of computer system 430 and/or remote computing resources such as server-hosted resources, cloud-based resources, online resources, remote data stores, remote databases, remote repositories, web services, web sites, web pages, web content, and/or other types of remote resources.

Computer programs 437 can implement computer-executable instructions that are stored in computer-readable storage media such as memory 432 or hardware storage 433, for example. Computer-executable instructions implemented by computer programs 437 can be configured to work in conjunction with, support, and/or enhance one or more of operating system 438 and applications 439. Computer-executable instructions implemented by computer programs 437 also can be configured to provide one or more separate and/or stand-alone services.

Computer system 430 and/or computer programs 437 can implement and/or perform various aspects of the described subject matter. As shown, computer system 430 and/or computer programs 437 can include virtualization code 440. In various embodiments, virtualization code 440 can include computer-executable instructions that are stored on a computer-readable storage medium and configured to implement one or more aspects of the described subject matter. By way of example, and without limitation, virtualization code 440 can implement one or more aspects of virtualization framework 100 and/or perform one or more aspects of computer-implemented method 300. By way of further example, and without limitation, computer system 430 can be a server computer in a hardware layer that supports and implements virtualization framework 100.

Computing device 410 and computer system 430 can communicate over network 450, which can be implemented by any type of network or combination of networks suitable for providing communication between computing device 410 and computer system 430. Network 450 can include, for example and without limitation: a WAN such as the Internet, a LAN, a telephone network, a private network, a public network, a packet network, a circuit-switched network, a wired network, and/or a wireless network. Computing device 410 and computer system 430 can communicate over network 450 using various communication protocols and/or data types. One or more communication interfaces 416 of computing device 410 and one or more communication interfaces 436 of computer system 430 can be employed in the context of communicating over network 450.

Computing device 410 and/or computer system 430 can communicate with a storage system 460 over network 450. Alternatively or additionally, storage system 460 can be integrated with computing device 410 and/or computer system 430. Storage system 460 can be representative of various types of storage in accordance with the described subject matter. Storage system 460 can provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 460 can be implemented by one or more computing devices, such as a computer cluster in a datacenter, by virtual machines, and/or provided as a cloud-based storage service.

Supported Aspects

The detailed description provided above in connection with the appended drawings explicitly describes and supports various aspects in accordance with the described subject matter. By way of illustration and not limitation, supported aspects include a computer system configured to acquire forensics data from running virtual machines, the computer system comprising: a processor configured to execute computer-executable instructions; and memory storing computer-executable instructions configured to: run a hypervisor that hosts a virtualization environment including a root virtual machine partition and one or more child virtual machine partitions; provide a forensics partition that includes a forensics service application programming interface configured to target one or more virtual machines and acquire forensics data from a targeted virtual machine running in a particular child virtual machine partition via one or more inter-partition communication mechanisms supported by the virtualization environment hosted by the hypervisor; and expose the forensics service application programming interface to a forensics tool as part of a cloud-based forensics service.

Supported aspects include the foregoing computer system, wherein the forensics partition is implemented as an additional root partition that is more privileged than each of the one or more child virtual machine partitions or wherein the forensics partition is implemented as an additional child virtual machine partition.

Supported aspects include any of foregoing computer systems, wherein the one or more inter-partition communication mechanisms include an inter-partition bus that is implemented by the forensics partition and the particular child virtual machine partition.

Supported aspects include any of foregoing computer systems, wherein the one or more inter-partition communication mechanisms include a hypercall interface that is implemented by the forensics partition and that is configured to invoke a hypercalls application programming interface of the hypervisor.

Supported aspects include any of foregoing computer systems, wherein the one or more inter-partition communication mechanisms include a forensics switch that is implemented by the root virtual machine partition and that interconnects the forensics service application programming interface and the particular child virtual machine partition.

Supported aspects include any of foregoing computer systems, wherein the memory further stores computer-executable instructions configured to: dynamically add a forensics interface to a child virtual machine partition; and connect a forensics switch to the forensics interface.

Supported aspects include any of foregoing computer systems, wherein the forensics service application programming interface is configured to convert a call from the forensics tool into a call supported by the one or more inter-partition communication mechanisms.

Supported aspects include any of foregoing computer systems, wherein the forensics data includes one or more of: filesystem artifacts, network artifacts, memory artifacts, and event log artifacts.

Supported aspects include an apparatus, a computer-readable storage medium, a computer-implemented method, and/or means for implementing any of the foregoing computer systems or portions thereof.

Supported aspects include a computer-implemented method performed by a computer system to acquire forensics data from running virtual machines, the computer-implemented method comprising: implementing a hypervisor-hosted virtualization environment that includes a root virtual machine partition and one or more child virtual machine partitions; providing a forensics partition that includes a forensics service application programming interface configured to target one or more virtual machines and acquire forensics data from a targeted virtual machine running in a particular child virtual machine partition via one or more inter-partition communication mechanisms supported by the virtualization environment hosted by the hypervisor; and exposing the forensics service application programming interface to a forensics tool as part of a cloud-based forensics service.

Supported aspects include the foregoing computer-implemented method, wherein the forensics partition is implemented as an additional root partition that is more privileged than each of the one or more child virtual machine partitions or wherein the forensics partition is implemented as an additional child virtual machine partition.

Supported aspects include any of the foregoing computer-implemented methods, further comprising: communicating a request for forensics data between the forensics service application and the targeted virtual machine over an inter-partition bus that is implemented by the forensics partition and the particular child virtual machine partition.

Supported aspects include any of the foregoing computer-implemented methods, further comprising: communicating a request for forensics data between the forensics service application and the targeted virtual machine using a hypercall interface that is implemented by the forensics partition and that is configured to invoke a hypercalls application programming interface of the hypervisor.

Supported aspects include any of the foregoing computer-implemented methods, further comprising: communicating a request for forensics data between the forensics service application and the targeted virtual machine through a forensics switch that is implemented by the root virtual machine partition and that interconnects the forensics service application programming interface and the particular child virtual machine partition.

Supported aspects include any of the foregoing computer-implemented methods, further comprising: dynamically adding a forensics interface to a child virtual machine partition; and connecting a forensics switch to a forensics interface.

Supported aspects include any of the foregoing computer-implemented methods, wherein the forensics data includes one or more of: filesystem artifacts, network artifacts, memory artifacts, and event log artifacts.

Supported aspects include a system, an apparatus, a computer-readable storage medium, and/or means for implementing and/or performing any of the foregoing computer-implemented methods or portions thereof.

Supported aspects include a computer-readable storage medium storing computer-executable instructions that, when executed by a computer system, cause the computer system to implement: a hypervisor-hosted virtualization environment including a root virtual machine partition and one or more child virtual machine partitions; and a forensics partition that includes a forensics service application programming interface configured to target one or more virtual machines and acquire forensics data from a targeted virtual machine running in a particular child virtual machine partition via one or more inter-partition communication mechanisms supported by the hypervisor-hosted virtualization environment, wherein the forensics service application programming interface is exposed to a forensics tool as part of a cloud-based forensics service.

Supported aspects include the foregoing computer-readable storage medium, wherein the one or more inter-partition communication mechanisms include at least one of: an inter-partition bus that is implemented by the forensics partition and the particular child virtual machine partition, and a hypercall interface that is implemented by the forensics partition and that is configured to invoke a hypercalls application programming interface of the hypervisor.

Supported aspects include any of the foregoing computer-readable storage media, further storing computer-executable instructions that, when executed by the computer system, cause the computer system to implement: a forensics switch within the root virtual machine partition, wherein the forensics switch interconnects the forensics service application programming interface and the particular child virtual machine partition.

Supported aspects include an apparatus, a system, a computer-implemented method, and/or means for implementing any of the foregoing computer-readable media or performing the functions thereof.

Supported aspects can provide various attendant and/or technical advantages in terms of scalability, improved efficiency, and/or savings with respect to power consumption, memory, processor cycles, and/or other computationally-expensive resources.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computing system comprising:
a processor; and
memory storing instructions executable by the processor, wherein the instructions, when executed, provide a hypervisor configured to:
host a virtualization environment that includes a set of virtual machine (VM) partitions that each include an isolated execution environment managed by the hypervisor, the set of VM partitions comprising:
a root virtual machine (VM) partition,
a first child VM partition that is hypervisor-aware,
a second child VM partition that is non-hypervisor-aware, and
a forensics VM partition that:
includes a forensics service application programming interface (API),
is configured to directly access hardware resources associated with the computing system, and
is separate from, and more privileged than, the first child VM partition; and
create, in the virtualization environment:
a first inter-partition communication mechanism configured to provide a communication channel between the forensics VM partition and the first child VM partition, and
a second inter-partition communication mechanism;
wherein the forensics VM partition is configured to:
acquire, by the first inter-partition communication mechanism, forensics data from a VM running in the first child VM partition; and
provide the forensics data to a forensics service using the forensics service API.

2. The computing system of claim 1, wherein the forensics VM partition is further configured to:
acquire forensics data from a second VM running in the second child VM partition using the second inter-partition communication mechanism.

3. The computing system of claim 1, wherein the first inter-partition communication mechanism comprises an inter-partition bus, and the second inter-partition communication mechanism comprises a forensics switch implemented by the root VM partition and provides a communication channel between the forensics VM partition and the second child VM partition, wherein the second child VM partition does not support the first inter-partition communication mechanism.

4. The computing system of claim 1, wherein the forensics service comprises a cloud-based forensics service, and the forensics VM partition implements a virtualization stack and is less privileged than the root VM partition.

5. The computing system of claim 3, wherein the hypervisor is configured to:
dynamically add a forensics interface to the second child VM partition; and
selectively connect the forensics switch to the forensics interface.

6. The computing system of claim 1, wherein the forensics VM partition, the root VM partition, and the first child VM partition are each more privileged than the second child VM partition.

7. The computing system of claim 1, wherein the first inter-partition communication mechanism comprises a hypercall interface that is implemented by the forensics VM partition and configured to invoke a hypercall API of the hypervisor.

8. The computing system of claim 1, wherein the forensics service API is configured to convert a call from the forensics service into a call supported by the first inter-partition communication mechanism.

9. The computing system of claim 1, wherein the forensics data includes one or more of:
a filesystem artifact, a network artifact, a memory artifact, or an event log artifact.

10. A method performed by a computing system, the method comprising:
hosting, by a hypervisor, a hypervisor-hosted virtualization environment that includes a set of virtual machine (VM) partitions that each include an isolated execution environment managed by the hypervisor, the set of VM partitions comprising:
a root VM partition,
a first child VM partition that is hypervisor-aware,
a second child VM partition that is non-hypervisor-aware, and
a forensics VM partition that:
includes a forensics service application programming interface (API),
is configured to directly access hardware resources associated with the computing system, and
is separate from, and more privileged than, the first child VM partition;
creating, in the virtualization environment:
a first inter-partition communication mechanism configured to provide a communication channel between the forensics VM partition and the first child VM partition, and
a second inter-partition communication mechanism;
acquiring, by the forensics VM partition using the first inter-partition communication mechanism, forensics data from a VM running in the first child VM partition;
providing, by the forensics service API, the forensics data to a forensics service.

11. The computer-implemented method of claim 10, and further comprising:
acquiring, by the forensics VM partition, forensics data from a second VM running in the second child VM partition using the second inter-partition communication mechanism.

12. The computer-implemented method of claim 10, wherein the first inter-partition communication mechanism comprises an inter-partition bus, and the second inter-partition communication mechanism comprises a forensics switch implemented by the root VM partition and provides a communication channel between the forensics VM partition and the second child VM partition, wherein the second child VM partition does not support the first inter-partition communication mechanism.

13. The computer-implemented method of claim 10, wherein the forensics service comprises a cloud-based forensics service, and the forensics VM partition implements a virtualization stack and is less privileged than the root VM partition.

14. The computer-implemented method of claim 10, wherein the first inter-partition communication mechanism comprises an inter-partition bus, and further comprising:
communicating, by the forensics VM partition, a request for forensics data to the VM, running in the first child VM partition, over the inter-partition bus.

15. The computer-implemented method of claim 10, further comprising:
communicating, by the forensics VM partition, a request for forensics data to the VM, running in the first child VM partition, using a hypercall interface that is implemented by the forensics VM partition and that is configured to invoke a hypercall API of the hypervisor.

16. The computer-implemented method of claim 10, wherein the forensics data includes one or more of:
a filesystem artifact, a network artifact, a memory artifact, or an event log artifact.

17. A computing system, comprising:
a processor; and
memory storing instructions executable by the processor, wherein the instructions, when executed, configure the computing system to provide:
a hypervisor configured to:
provide a hypervisor-hosted virtualization environment including a set of virtual machine (VM) partitions that each include an isolated execution environment managed by the hypervisor, the set of VM partitions comprising:
a root VM partition,
a first child VM partition that is hypervisor-aware,
a second child VM partition that is non-hypervisor-aware, and
a forensics VM partition that:
is hosted by the hypervisor and more privileged than the first child VM partition,
includes a forensics service application programming interface (API) that is exposed to a forensics service,
implements a virtualization stack configured to directly access hardware resources associated with the computing system, and
is configured to acquire forensics data from a VM running in the first child VM partition via an inter-partition bus supported by the hypervisor-hosted virtualization environment.

18. The computing system of claim 17, wherein the forensics service comprises a cloud-based forensics service, and the instructions, when executed, configure the computing system to provide:
a forensics switch that is associated with the root VM partition and interconnects the forensics service API and the second child VM partition.

19. The computing system of claim 18, wherein the forensics switch enables the forensics service API to selectively access resources of the second child VM partition.

20. The computing system of claim 17, wherein the inter-partition bus is implemented by the forensics VM partition and the first child VM partition, and the forensics VM partition is:
more privileged than the first child VM partition, and
less privileged than the root VM partition.

* * * * *